US011969909B2

(12) United States Patent
Dovel

(10) Patent No.: US 11,969,909 B2
(45) Date of Patent: Apr. 30, 2024

(54) UTILITY BLADES AND COMBINATION BLADE HOLDERS

(71) Applicant: DAREX, LLC, Ashland, OR (US)

(72) Inventor: Daniel T Dovel, Ashland, OR (US)

(73) Assignee: DAREX, LLC, Ashland, OR (US)

( * ) Notice: Subject to any disclaimer, the term of this patent is extended or adjusted under 35 U.S.C. 154(b) by 8 days.

(21) Appl. No.: 18/167,578

(22) Filed: Feb. 10, 2023

(65) Prior Publication Data

US 2024/0001569 A1 Jan. 4, 2024

Related U.S. Application Data

(62) Division of application No. 17/856,147, filed on Jul. 1, 2022, now Pat. No. 11,642,801.

(51) Int. Cl.
*B26B 5/00* (2006.01)
*B26B 9/00* (2006.01)

(52) U.S. Cl.
CPC ................ *B26B 5/003* (2013.01); *B26B 9/00* (2013.01)

(58) Field of Classification Search
None
See application file for complete search history.

(56) References Cited

U.S. PATENT DOCUMENTS 1,940,855 A 12/1933 Friedman
3,107,426 A 10/1963 Robinson
3,900,950 A 8/1975 Collins
5,875,551 A 3/1999 Huang
6,467,173 B1 10/2002 Umstead
6,688,003 B2 2/2004 Scarla
6,915,577 B2 7/2005 Scala
7,325,314 B1 2/2008 Chen
8,978,254 B1 3/2015 White
9,095,985 B2 8/2015 Syrjala
9,687,987 B2 6/2017 Bloch et al.
10,493,639 B2 12/2019 Medhurst
10,926,423 B1 2/2021 Panosian et al.
11,104,041 B2 8/2021 Jaker et al.
11,305,440 B2 4/2022 Demko
(Continued)

OTHER PUBLICATIONS

Rapid Tools Multi-Use Fixed Knife with Value Added Features. mov, https://www.youtube.com/watch?v=sWa9thg26Kk. Retrieved Jul. 14, 2022.

(Continued)

*Primary Examiner* — Hwei-Siu C Payer
(74) *Attorney, Agent, or Firm* — Workman Nydegger

(57) ABSTRACT

A utility blade includes a first blade retention feature positioned on a proximal edge of a tang of the utility blade. The proximal edge is angularly offset from a longitudinal axis of the utility blade. The first blade retention feature is associated with an engagement axis parallel to the longitudinal axis of the utility blade. The utility blade is configured to translate along the engagement axis to cause the first blade retention feature to engage with a first blade engagement component of a blade holder. The utility blade further includes a second blade retention feature positioned on a second edge of the tang of the utility blade. The second blade retention feature is positioned along the longitudinal axis of the utility blade and between the first blade retention feature and a distal tip of a cutting portion of the utility blade.

20 Claims, 6 Drawing Sheets

(56) References Cited

U.S. PATENT DOCUMENTS

| | | | | |
|---|---|---|---|---|
| 11,338,456 | B2 | 5/2022 | Patterson | |
| 11,370,132 | B2 | 6/2022 | Tsai | |
| 11,571,826 | B1 * | 2/2023 | Dovel | B26B 5/003 |
| 11,642,801 | B1 * | 5/2023 | Dovel | B26B 5/001 30/162 |
| 2005/0252010 | A1 | 11/2005 | Freeman | |
| 2007/0044323 | A1 | 3/2007 | Chao | |
| 2009/0217536 | A1 | 9/2009 | Medhurst | |
| 2009/0223063 | A1 | 9/2009 | Hallquist | |
| 2009/0300920 | A1 | 12/2009 | Gui | |
| 2010/0175532 | A1 * | 7/2010 | Evatt | B23D 61/123 83/835 |
| 2017/0348863 | A1 | 12/2017 | Browning | |
| 2020/0391397 | A1 | 12/2020 | Cauley, Jr. et al. | |
| 2022/0126463 | A1 | 4/2022 | Home | |

OTHER PUBLICATIONS

Office Action for U.S. Appl. No. 17/856,147; dated Sep. 23, 2022.
Notice of Allowance for U.S. Appl. No. 17/856,147; dated Jan. 19, 2023.

* cited by examiner

UTILITY BLADES AND COMBINATION BLADE HOLDERS

CROSS-REFERENCE TO RELATED APPLICATIONS

This application is a divisional of U.S. patent application Ser. No. 17/856,147, filed Jul. 1, 2022, and titled Utility Blades and Combination Blade Holders, now U.S. Pat. No. 11,642,801, the entire content of which is incorporated herein by reference.

BACKGROUND

This disclosure generally relates to utility blades and utility blade holders. Utility blades are often utilized for general manual work purposes. Ideal utility blades have durable cutting edges with a stable construction suitable for rough work.

Many conventional utility blades have a double-end cutter design with symmetric cutting edges on both ends and with symmetric mounting features enabling either end of the utility blade to be mounted to a utility knife blade holder. The cutting edge geometries that may be implemented on double-end utility blades are limited to geometries that are able to properly engage with mounting features of a utility knife blade holder. Furthermore, cutting edges of double-end utility blades that are engaged with utility knife mounting features are often dulled by the interaction with the utility knife blade holder, reducing the longevity of the double-end utility blade.

Still further, because the cutting edges of double-end utility blades are configured to interact with utility knife mounting features to facilitate blade positioning within the utility knife, sharpening of the cutting edges can disrupt or modify positioning of the double-end utility blade within the utility knife. This can lead to free movement and/or a loose engagement between the double-end utility blade and the utility knife blade holder.

Accordingly, there are a number of disadvantages associated with conventional utility blades and/or blade holders that can be addressed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Implementations of the present disclosure extend at least to utility blades and/or utility blade holders.

Some embodiments provide a utility blade that includes a first blade retention feature positioned on a proximal edge of a tang of the utility blade. The proximal edge is angularly offset from a longitudinal axis of the utility blade. The first blade retention feature is associated with an engagement axis parallel to the longitudinal axis of the utility blade. The utility blade is configured to translate along the engagement axis to cause the first blade retention feature to engage with a first blade engagement component of a blade holder. The utility blade further includes a second blade retention feature positioned on a second edge of the tang of the utility blade. The second blade retention feature is positioned along the longitudinal axis of the utility blade and between the first blade retention feature and a distal tip of a cutting portion of the utility blade.

Some embodiments provide a utility knife that includes a utility blade with a cutting portion that extends a cutting distance from a distal tip of the utility blade in a distal-to-proximal direction along a longitudinal axis of the utility blade. The utility blade further includes a first blade retention feature positioned on a tang of the utility blade at a first distance from the distal tip in the distal-to-proximal direction along the longitudinal axis. The first distance is greater than the cutting distance. The utility blade further includes a second blade retention feature positioned on the tang of the utility blade at a second distance from the distal tip in the distal-to-proximal direction along the longitudinal axis. The second distance may be less than the first distance. The utility knife may further include a blade holder configured to hold the utility blade and, alternately, a reversible utility blade that is different from the utility blade.

Some embodiments provide a blade holder that is configured to selectively secure a non-reversible blade and, alternately, a reversible blade. The blade holder includes a first blade engagement component configured to engage with (i) a first blade retention feature of the non-reversible blade (where the first blade retention feature is positioned on a proximal edge of a tang of the non-reversible blade) and (ii) at least one of a pair of end surfaces of the reversible blade (where the pair of end surfaces is positioned on opposing ends of the reversible blade, and where the pair of end surfaces is configured for alternate engagement with the first blade engagement component to facilitate reversible securement of the reversible blade within the blade holder). The blade holder also includes a second blade engagement component configured to engage with (i) a second blade retention feature of the non-reversible blade (where the second blade retention feature is positioned on a second edge of the tang of the non-reversible blade and is positioned, along a longitudinal axis of the non-reversible blade, between the first blade retention feature and a distal tip of a cutting portion of the non-reversible blade), and (ii) at least one of a pair of blade retention features of the reversible blade (where the pair of blade retention features is positioned on a shared surface of the reversible blade, and where the pair of blade retention features is configured for alternate engagement with the second blade engagement component to facilitate reversible securement of the reversible blade within the blade holder).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures are not necessarily drawn to scale.

DETAILED DESCRIPTION

Implementations of the present disclosure extend to utility blades and combination blade holders.

At least some example utility blades of the present disclosure may comprise non-reversible utility blades, which can advantageously implement versatile geometries and/or allow for increased strength and/or increased length of exposed cutting edge relative to existing utility blade designs (e.g., compared to reversible utility blades).

At least some non-reversible utility blades of the present disclosure may comprise multiple blade retention features configured to interface with blade engagement components of blade holders. The blade retention features may be arranged on different edges of the tang of the non-reversible utility blades to facilitate improved blade stability when mounted to a blade holder. The precise arrangement of the multiple blade retention features on different edges of the tang of the utility blade (which may remain unaffected by knife sharpening) may additionally, or alternatively, facilitate safer and/or easier blade mounting and/or removal.

At least some example blade holders of the present disclosure may include multiple blade engagement components that are configured to selectively interface and engage with the multiple blade retention features of the non-reversible utility blades noted above. The blade engagement components of the disclosed blade holders may exert forces on the non-reversible utility blade being held that reduce or eliminate undesirable/unsafe free movement of the non-reversible utility blade within the blade holder. The blade engagement components of the disclosed blade holders may advantageously be configured to selectively secure conventional reversible utility blades (double-end cutter utility blades) with the same mounting components used to secure non-reversible utility blades (e.g., despite differing shapes, geometries, and/or features of reversible utility blades relative to non-reversible utility blades). Such functionality may increase the usability and versatility of the disclosed blade holders for consumers.

Attention will now be directed to FIGS. 1 through 8, which provide various supporting illustrations related to the disclosed embodiments.

Figure 1:
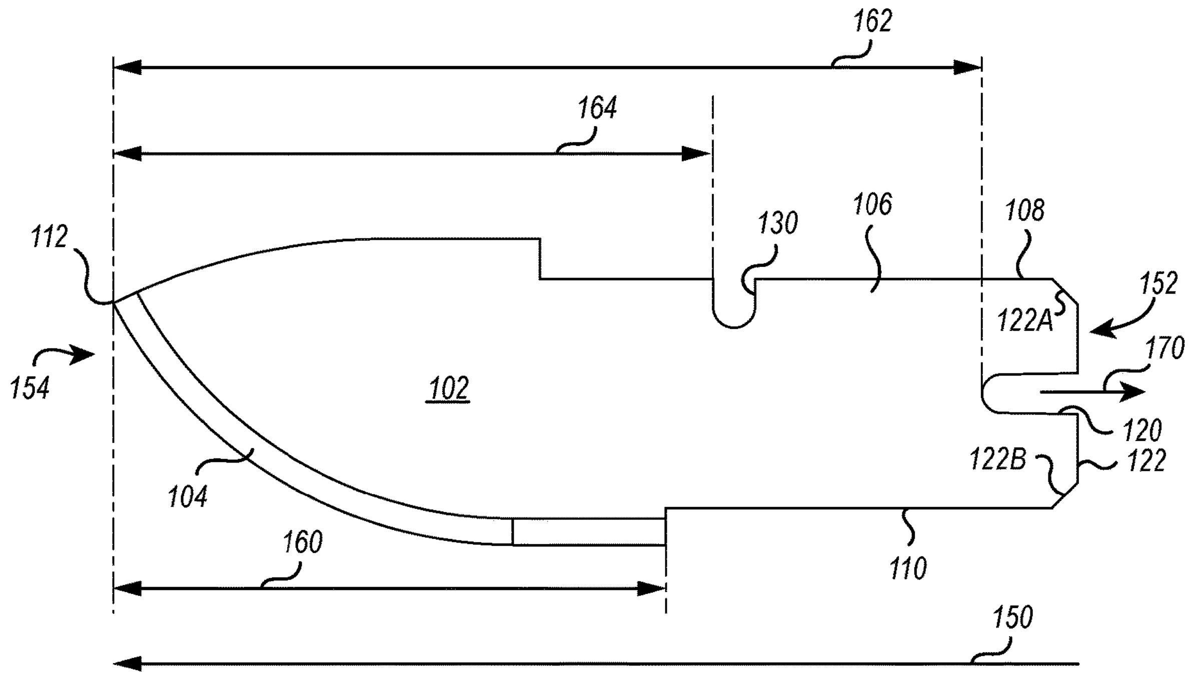
FIG. 1 illustrates a side view of an example non-reversible utility blade, in accordance with implementations of the present disclosure.

FIG. 1 illustrates a side view of an example utility blade 102, in accordance with implementations of the present disclosure. The utility blade 102 of FIG. 1 includes a cutting portion 104 as well as a tang 106. The cutting portion 104 (or cutting edge) enables the utility blade 102 to perform cutting functions, and the tang 106 comprises various blade attachment or blade retention features that enable a blade holder (e.g., blade holder 202 of FIG. 2) to selectively secure the utility blade 102.

Figure 2:
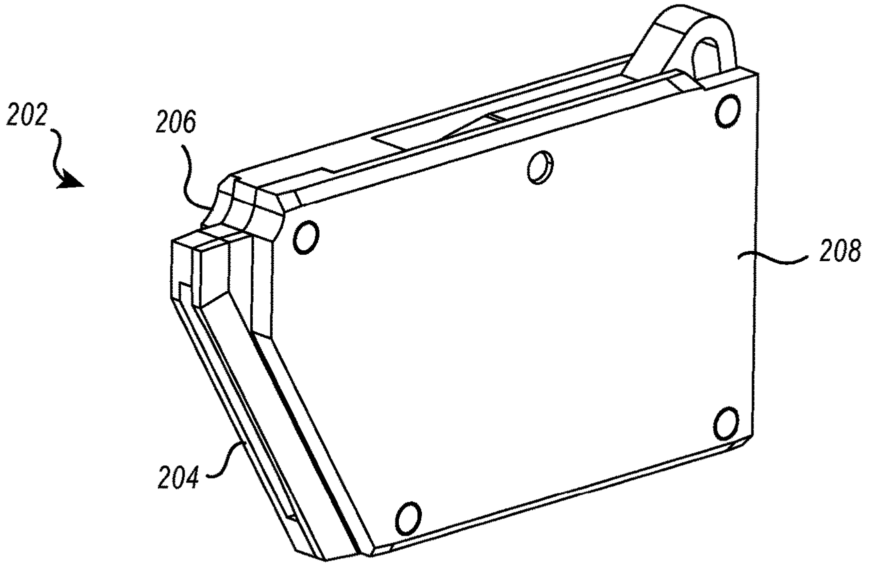
FIG. 2 illustrates a perspective view of an isolated combination blade holder, in accordance with implementations of the present disclosure.

In the example of FIG. 1, the utility blade 102 comprises a non-reversible blade, such that only one end of the utility blade 102 is configured to interact with blade engagement components of a blade holder (e.g., blade holder 202 of FIG. 2). The utility blade 102 of FIG. 1 is asymmetrical along a longitudinal axis 150 of the utility blade (e.g., the utility blade 102 cannot be bisected into symmetric parts at any point along the longitudinal axis 150, in contrast with the reversible utility blade shown and described with reference to FIGS. 4 and 5). The shape of the utility blade 102 of FIG. 1 is different on opposing ends of the utility blade 102 along the longitudinal axis 150. For instance, the shape of the utility blade 102 of FIG. 1 at a proximal end 152 of the utility blade 102 is different than the shape of the utility blade 102 at a distal end 154 of the utility blade 102.

Figure 4:
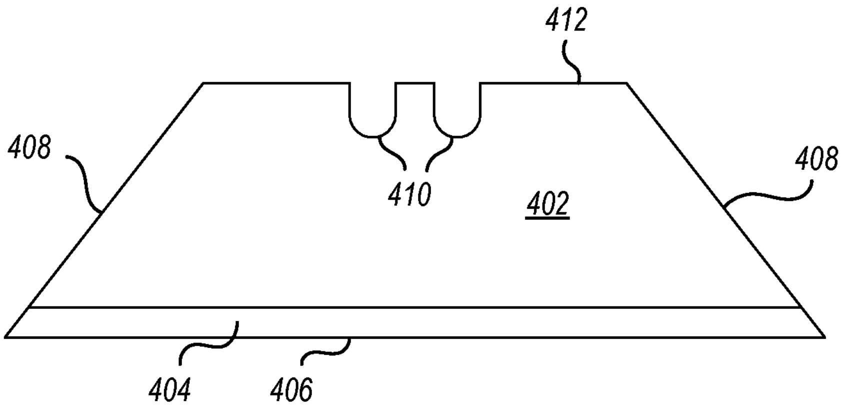
FIG. 4 illustrates a side view of an example reversible utility blade, in accordance with implementations of the present disclosure.

In some implementations, because the utility blade 102 is not constrained to symmetric geometries where both ends are configured to interact with blade engagement components of a blade holder, the utility blade 102 is able to include versatile blade geometries that allow for increased strength and/or increased length of exposed cutting portion relative to existing utility blade designs (e.g., compared to the reversible utility blade 402 of FIG. 4).

As used herein, a "longitudinal axis" of a utility blade refers to an axis that extends along a main length of the utility blade (or along a main length of a tang of the utility blade). As noted above, an example longitudinal axis 150 of the utility blade 102 is shown in FIG. 1. In some instances, a longitudinal axis of a utility blade extends parallel to a non-curved edge of the utility blade (e.g., a non-curved edge of the tang of the utility blade, such as top edge 108 or bottom edge 110 of the tang 106 of the utility blade 102 of FIG. 1, or an edge upon which a second blade retention feature 130 is positioned). A longitudinal axis of a utility blade may extend along a center axis of the utility blade (e.g., along a middle of a tang of the utility blade). A longitudinal axis of a utility blade may extend along a translation axis associated with the utility blade, such as an axis along which the utility blade is configured to translate into engagement with a blade holder (see FIG. 3C) or an axis along which the utility blade is configured to translate pursuant to selective deployment or selective retraction of the utility blade (see FIGS. 7A through 7C).

As used herein, in particular for non-reversible utility blades, "proximal" refers to a direction along a longitudinal axis of a utility blade that points toward the end of the utility blade that includes (or is closest to) the tang of the utility blade. For example, a proximal direction associated with a utility blade may be directed from the cutting portion of the utility blade (e.g., cutting portion 104 of the utility blade 102) toward the tang of the utility blade (e.g., tang 106 of the utility blade 102), or from a distal tip of a utility blade (e.g., point 112 of the utility blade 102 of FIG. 1) toward a portion of the utility blade configured to interact with blade engagement components of a blade holder. As noted above, an example proximal end 152 of a utility blade 102 is provided in FIG. 1.

"Distal" refers to a direction along a longitudinal axis of a utility blade that points toward the cutting portion and/or distal tip of the utility blade (e.g., point 112). A distal direction associated with a utility blade may be opposite to a proximal direction for the utility blade (e.g., a distal direction may point away from a tang portion of a utility blade and toward a cutting edge and/or distal tip of the utility blade). As noted above, an example distal end 154 of a utility blade 102 is provided in FIG. 1. In the example of FIG. 1, a proximal-to-distal direction for the utility blade 102 may extend along the arrow showing the longitudinal axis 150 of FIG. 1, whereas a distal-to-proximal direction for the utility blade 102 may extend opposite to the arrow showing the longitudinal axis 150.

The terms "proximal" and "distal" may be used to define absolute and/or relative positioning of components, features, or parts of a utility blade. For example, a "proximal" feature of a utility blade may be arranged on a proximal edge or proximal-most edge of the utility blade, or may be arranged proximal to another feature of the utility blade (e.g., closer to the proximal end of the utility blade than the other feature of the utility blade). Similarly, a "distal" feature of a utility blade may be arranged on a distal edge or distal-most edge of the utility blade, or may be arranged distal to another feature of the utility blade (e.g., close to the distal end of the utility blade than the other feature of the utility blade).

The utility blade 102 of FIG. 1 includes various blade retention features or components that facilitate selective securement of the utility blade 102 to a blade holder (e.g., blade holder 202 of FIG. 2, which will be described in more detail hereinafter). Such blade retention features may allow the utility blade 102 to provide improved blade stability and/or provide a safer or easier blade mounting or blade changing experience relative to conventional utility blades.

The utility blade 102 of FIG. 1 includes a first blade retention feature 120 positioned on (or extending from) a proximal edge 122 of the tang 106 of the utility blade 102. In the example of FIG. 1, the first blade retention feature 120 of the utility blade 102 is implemented in the form of a notch that extends inward (e.g., into the main body of the utility blade) from the proximal edge 122 of the utility blade 102. As will be discussed hereinafter, the notch may interface with one or more guide rails, guide pins, or other blade engagement components of a blade holder to facilitate selective securement of the utility blade to the blade holder (see FIGS. 3A-3C). In some implementations, the first blade retention feature 120 may additionally operate as a limit stop for insertion of the utility blade 102 into the blade holder.

Although FIG. 1 focuses, in at least some respects, on an example in which the first blade retention feature 120 is implemented as a notch on the proximal edge 122 of the utility blade 102, a blade retention feature may take on other forms in accordance with the scope of the present disclosure. For example, a blade retention feature may take the form of one or more protrusions, rails, pins, depressions, channels, channel engagement features, combinations thereof, and/or other surface deviations (with the blade engagement component(s) of the blade holder including corresponding, complementary features).

FIG. 1 illustrates an engagement axis 170 associated with the first blade retention feature 120. The engagement axis 170 indicates a movement axis along which the first blade retention feature 120 may be translated or advanced to cause engagement between the first blade retention feature and a blade engagement component of a blade holder (e.g., first blade engagement component 210, as will be described in more detail hereinafter). In the example of FIG. 1, the engagement axis 170 is parallel to the longitudinal axis 150 of the utility blade (in some implementations, the engagement axis 170 may be nonparallel to the longitudinal axis 150).

In the example of FIG. 1, the proximal edge 122 (upon which the first blade retention feature 120 is disposed) is angularly offset from the longitudinal axis 150 associated with the utility blade 102. FIG. 1 illustrates a proximal edge 122 that is primarily perpendicular to the longitudinal axis 150, but other angular offsets are within the scope of the present disclosure. The proximal edge 122 may comprise an edge of the tang 106 of the utility blade 102 for which a normal vector of the edge includes a direction component parallel to the longitudinal axis 150 (e.g., to enable interfacing with blade engagement components along the longitudinal axis 150). In some instances, the proximal edge 122 of the utility blade 102 comprises an edge of the tang 106 of the utility blade 102 for which no other edge or surface of the utility blade 102 has all portions defining its edge or surface positioned proximal to the proximal edge 122 along the longitudinal axis 150.

In the example of FIG. 1, the cutting portion 104 of the utility blade 102 does not extend onto the proximal edge 122 of the utility blade 102. The first blade retention feature may be positioned proximal to the cutting portion 104 of the utility blade 102 along the longitudinal axis 150. In some implementations, the proximal edge 122 does not overlap with the cutting portion 104 of the utility blade 102 along the longitudinal axis 150 (e.g., no transverse/perpendicular line positioned along the longitudinal axis 150 would intersect with both the proximal edge 122 and the cutting portion 104 of the utility blade). Although FIG. 1 focuses on an example in which the proximal edge 122 comprises a non-curved surface, the proximal edge 122 may comprise an at least partially curved surface in some embodiments.

As illustrated in FIG. 1, the cutting portion 104 of the utility blade extends a cutting distance 160 along the longitudinal axis 150 from the distal tip of the utility blade 102 in the distal-to-proximal direction. In some implementations, as shown in the example of FIG. 1, the first blade retention feature 120 is positioned on the tang 106 of the utility blade 102 at a first distance 162 along the longitudinal axis 150 from the distal tip of the utility blade 102 in the distal-to-proximal direction, where the first distance 162 is greater than the cutting distance 160.

In the example of FIG. 1, the proximal edge 122 extends between the top edge 108 and the bottom edge 110 of the tang 106 of the utility blade 102. For instance, the proximal edge 122 of FIG. 1 includes sub-parts 122A, and 122B, which cause the proximal edge 122 to interface with both the top edge 108 and the bottom edge 110 of the tang 106 of the utility blade (a proximal edge 122 may comprise any number of sub-parts). One will understand, in view of the present disclosure, that the designations of "top" and "bottom" for edges of the tang 106 of the utility blade 102 are somewhat arbitrary, and that other designations may be made for edges of the tang 106 of the utility blade 102 that extend substantially along the longitudinal axis 150 of the utility blade 102 (or that extend between the proximal end 152 and the distal end 154 of the utility blade 102).

FIG. 1 further illustrates a second blade retention feature 130, which is positioned on the top edge 108 of the utility blade 102. The second blade retention feature 130 may be positioned on any edge of the tang 106 of the utility blade that is different than the edge upon which the first blade retention feature 120 is positioned (the edge upon which the second blade retention feature 130 is disposed may be regarded as a "second edge" or an "intermediate edge"). The second edge upon which the second blade retention feature 130 is disposed may extend substantially along the longitudinal axis 150 of the utility blade (e.g., the second edge has a directional component parallel to the longitudinal axis 150). In some instances, as in the example of FIG. 1, all portions of the second edge (upon which the second blade retention feature 130 is disposed) are arranged, along the longitudinal axis 150, distal to the proximal edge 122 (upon which the first blade retention feature 120 is disposed). In some implementations, the second edge is angularly offset from the proximal edge 122.

In the example of FIG. 1, the second blade retention feature 130 is positioned between the first blade retention feature 120 and the distal tip of the cutting portion 104 (e.g., point 112) of the utility blade 102 (e.g., along the longitudinal axis 150). Spacing the blade retention features across the longitudinal axis 150 of the utility blade may allow for stable blade mounting to the blade holder (see FIG. 3C). Similar to the first blade retention feature 120, the second blade retention feature 130 may take on various forms. Although only a single first blade retention feature 120 and a single second blade retention feature 130 are shown in the example of FIG. 1, one will appreciate, in view of the present disclosure, that any number of first and/or second blade retention features may be implemented on a utility blade (e.g., two first blade retention features arranged adjacent to one another on the proximal edge 122, two second blade retention features arranged adjacent to one another on the top edge 108 and/or bottom edge 110, etc.).

In some implementations, as shown in the example of FIG. 1, the second blade retention feature 130 is positioned on the tang 106 of the utility blade 102 at a second distance 164 along the longitudinal axis 150 from the distal tip of the utility blade 102 in the distal-to-proximal direction. In the example of FIG. 1, the second distance 164 is less than the first distance 162. In some instances, as shown in the example of FIG. 1, the second distance 164 is greater than the cutting distance 160.

Figure 8:
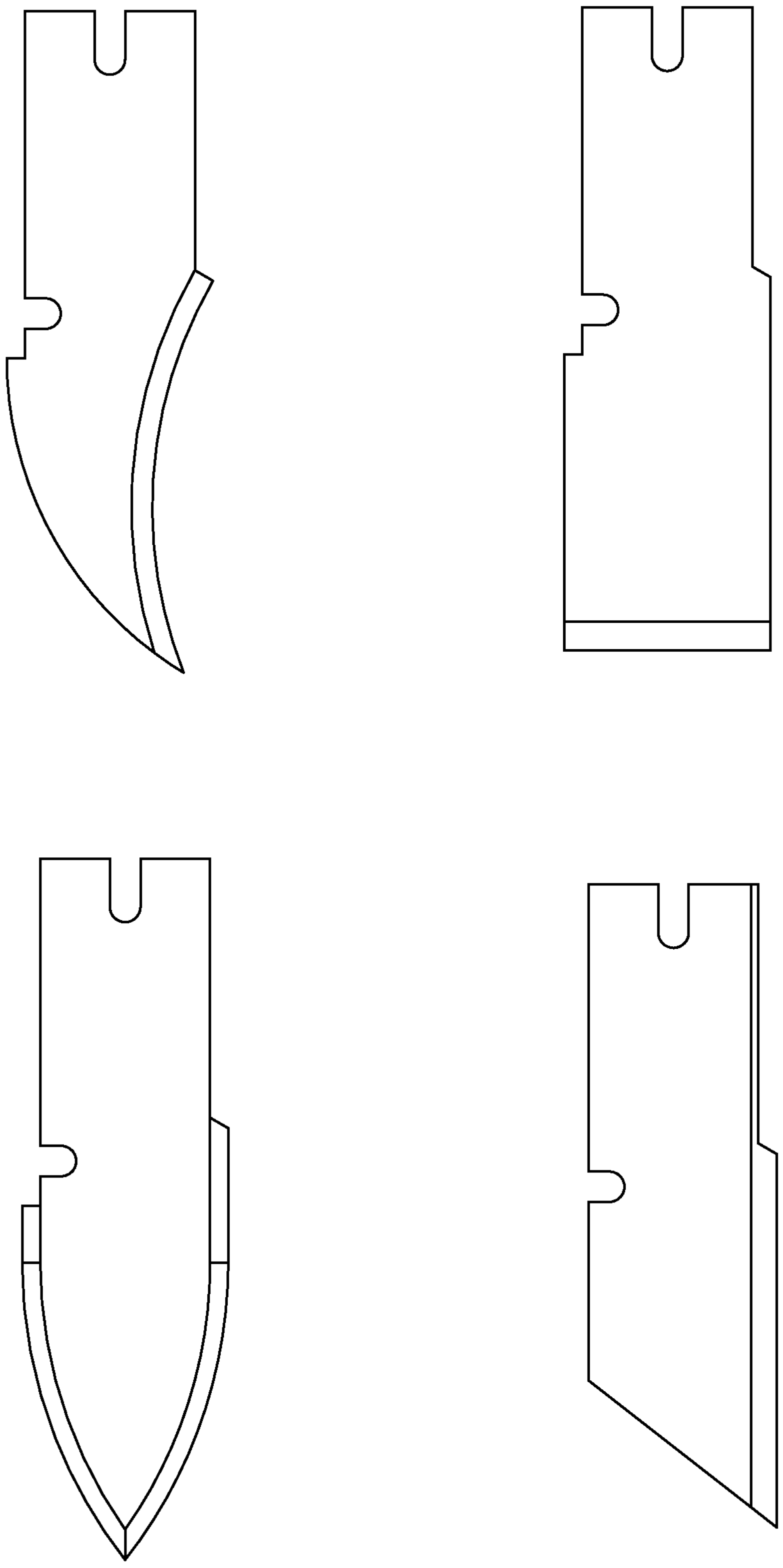
FIG. 8 illustrates side views of additional examples of non-reversible utility blades, in accordance with implementations of the present disclosure.

One will appreciate, in view of the present disclosure, that the particular dimensions and/or shapes associated with the utility blade 102 are not limiting of the principles disclosed herein and may be varied in accordance with the scope of the present disclosure. By way of non-limiting example, FIG. 8 provides example alternative designs for utility blades that include first and second blade retention features.

FIG. 2 illustrates a perspective view of a blade holder 202 configured to hold the utility blade 102 of FIG. 1. The blade holder 202 includes a front opening 204 through which the utility blade 102 is configured to extend when the blade retention features 120 and 130 of the utility blade 102 are engaged with the blade engagement components of the blade holder 202. The blade holder 202 includes housing components 206 and 208 that at least partially enclose the tang 106 of the utility blade 102 when the utility blade 102 is selectively held by the blade holder 202 (a blade holder 202 may comprise any number of housing components, at least some of which may be part of a handle of which the blade holder 202 is a part).

As will be described in more detail hereinafter, the blade holder 202 may comprise a combination blade holder configured to hold non-reversible utility blades (e.g., such as utility blade 102) and, alternately, reversible utility blades (e.g., such as reversible utility blade 402 of FIG. 4).

Figure 3A:
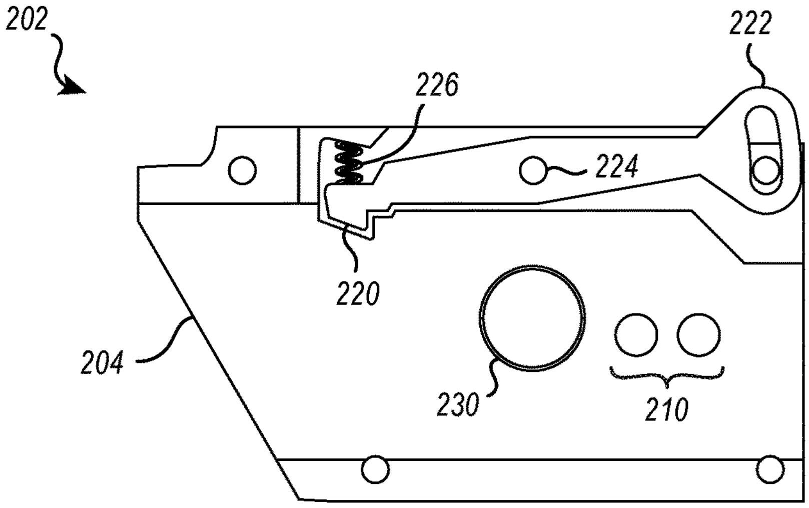
FIGS. 3A and 3B illustrate side views of a combination blade holder in different configurations, in accordance with implementations of the present disclosure.
Figure 3B:
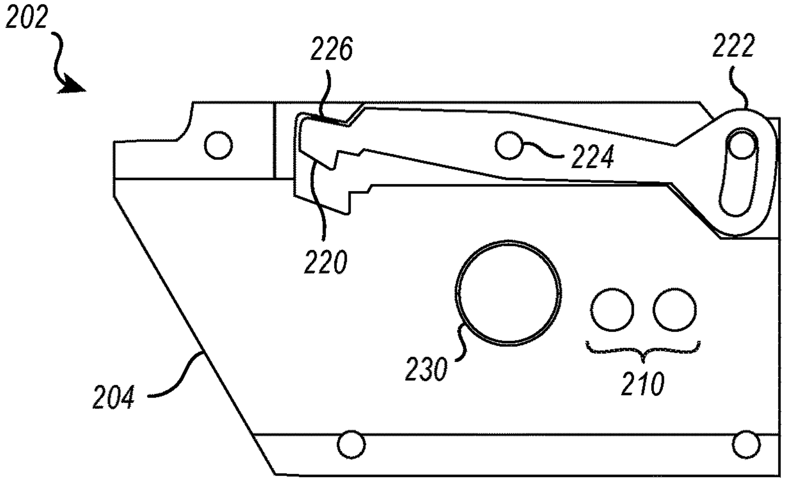
Figure 3C:
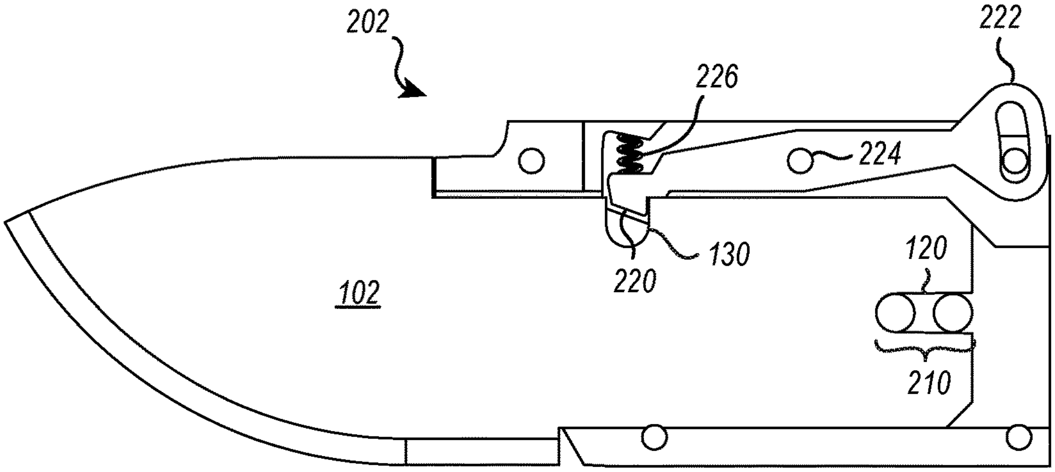
FIG. 3C illustrates a side view of a combination blade holder securing a non-reversible utility blade, in accordance with implementations of the present disclosure.

FIG. 3A illustrates a side view of the blade holder 202 with housing component 208 removed therefrom to show internal components of the blade holder 202. In the example of FIG. 3A, the blade holder 202 includes a first blade engagement component 210 that is configured to engage with the first blade retention feature 120 of the utility blade 102 (e.g., positioned on the proximal edge 122 of the utility blade 102). For example, the utility blade 102 may advance through the front opening 204 of the blade holder 202 to bring the first blade retention feature 120 into interfacing engagement with first blade engagement component 210. FIG. 3C illustrates the first blade retention feature 120 engaged with the first blade engagement component 210. The first blade engagement component 210 may provide a positioning guide (e.g., along a transverse axis perpendicular to the longitudinal axis 150 associated with the utility blade 102) for insertion of the utility blade 102 into the blade holder 202 allow the utility blade 102. The first blade engagement component 210 may additionally or alternatively operate as a limit stop for longitudinal positioning of the utility blade 102 within the blade holder 202.

In the example of FIGS. 3A and 3C, the first blade engagement component 210 is implemented in the form of two fixed pins extending transversely across the blade holder 202. The first blade engagement component 210 may take on various forms, in accordance with the present disclosure. For example, the first blade engagement component 210 may comprise one or more than two fixed pins or may comprise one or more fixed elongated rails. Other forms are within the scope of the present disclosure (e.g., as noted above, the first blade retention feature 120 may take the form of a protrusion; in such cases, the first blade engagement component 210 may take the form of a depression or channel configured to receive the protrusion of the first blade retention feature 120).

In some instances, the first blade engagement component 210 has an increasing diameter or transverse width in the distal-to-proximal direction (e.g., using the convention of the longitudinal axis 150 for the utility blade 102 when the utility blade 102 is secured within the blade holder 202). For instance, in the example of FIG. 3C, the distal pin of the first blade engagement component 210 may comprise a smaller diameter than the diameter of proximal pin of the first blade engagement component 210. Where the first blade engagement component 210 is implemented as one or more rails, the rail(s) may have non-parallel sides such that the transverse width of the rail(s) increases in the distal-to-proximal direction. In some instances, implementing an increasing diameter or transverse width in the distal-to-proximal direction for the first blade engagement component 210 enables tightening of the first blade retention feature 120 to the first blade engagement component 210 as the utility blade 102 advances into engagement with the blade holder 202 (e.g., thereby reducing play or free movement of the utility blade 102 when held by the blade holder 202). In implementations where the first blade retention feature 120 is implemented as a protrusion, the first blade engagement component 210 may include a decreasing diameter or transverse width in the distal-to-proximal direction to provide such tightening functionality. Furthermore, the first blade retention feature 120 may additionally or alternatively comprise a diameter or transverse width that changes in the distal-to-proximal direction to facilitate such tightening functionality.

In the example of FIGS. 3A and 3C, the first blade engagement component 210 is implemented as a set of fixed elements. In other implementations, the first blade engagement component 210 may be configured to actuate into engagement with the first blade retention feature 120.

FIG. 3A also illustrates a second blade engagement component 220 of the blade holder 202. The second blade engagement component 220 is configured to engage with the second blade retention feature 130 of the utility blade 102 (e.g., positioned on the top edge 108 of the utility blade 102). In the example of FIGS. 3A through 3C, the second blade engagement component 220 is actuatable via an actuator 222 (e.g., a blade lock lever). In the example of FIGS. 3A through 3C, the actuator 222, when actuated, causes rotation of the second blade engagement component 220 about a pivot 224. FIG. 3B shows the second blade engagement component 220 in an unengaged position (e.g., with the actuator 222 depressed, causing upward rotation of the second blade engagement component 220 about the pivot 224). FIG. 3C shows the second blade engagement component 220 in an engaged position, with the second blade engagement component 220 interfacing with the second blade retention feature 130 of the utility blade 102 (e.g., with the actuator in a non-depressed position, allowing a biasing member such as a spring 226 to bias the second blade engagement component 220 toward downward rotation into engagement with the second blade retention feature 130 of the utility blade 102).

The second blade engagement component 220 can facilitate locking of the utility blade 102 into the blade holder 202 (e.g., to prevent unintended or undesired removal of the utility blade 102 from the blade holder 202). The second blade engagement component 220 may additionally or alternatively reduce or prevent displacement of the utility blade 102 along the longitudinal axis associated with the utility blade 102 and/or along a transverse axis associated with the utility blade 102 (e.g., via biasing of the spring 226 or other biasing member(s)).

Although a rotational actuator with a biasing spring is shown in the example of FIGS. 3A through 3C for actuating the second blade engagement component 220, other types of actuators and/or biasing members (if included) may be utilized in accordance with the present disclosure (e.g., translational actuators). Furthermore, it should be noted that certain embodiments of the present disclosure may omit actuators for actuating the second blade engagement component 220 of the blade holder 202 such that the second blade engagement component 220 is fixed on the blade holder 202 (e.g., allowing for lateral blade insertion from the side of the blade holder, such as by permitting selective removal of housing components of the blade holder to enable lateral placement of the blade into engagement with the first and second blade engagement components).

In some implementations, the blade holder 202 further includes an additional biasing element 230 which may be configured to bias a blade held by the blade holder 202 toward a sidewall (or housing component) of the blade holder (e.g., to reduce or eliminate free play of the blade within the blade holder 202). In the example of FIGS. 3A through 3C, the biasing element 230 is implemented in the form of a magnet, but other types of biasing elements may be utilized in accordance with the present disclosure (e.g., springs and/or others).

According to at least some disclosed embodiments, a blade holder 202 may advantageously be configured to hold reversible utility blades in addition to non-reversible utility blades (e.g., utility blade 102). Such functionality may increase the usability of the blade holder 202 for consumers, such as by allowing consumers to use the blade holder 202 with existing reversible utility blades (which consumers may already have in their possession) in addition to non-reversible utility blades as presently disclosed (which may provide various practical advantages over existing reversible utility blades). FIG. 4 illustrates a side view of an example reversible utility blade 402 that may be held by the blade holder 202. The reversible utility blade 402 includes a cutting portion 404 that extends from one end of the bottom surface 406 of the reversible utility blade 402 to the other. The reversible utility blade 402 may correspond to a standard, readily available reversible utility blade, such as a STANLEY 1992 reversible utility knife blade.

Figure 5:
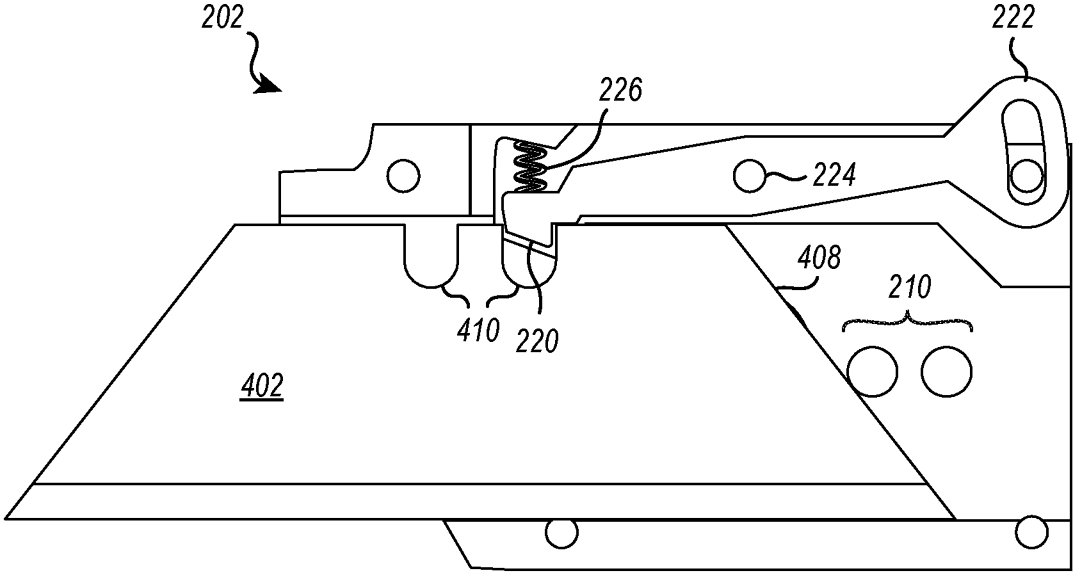
FIG. 5 illustrates a side view of a combination blade holder securing a reversible utility blade, in accordance with implementations of the present disclosure.

The same mounting mechanisms of the blade holder 202 for selectively securing the utility blade 102 (e.g., the first blade engagement component 210, the second blade engagement component 220, and/or the biasing element 230) may be used to allow the blade holder 202 to selectively secure the reversible utility blade 402. For instance, the reversible utility blade 402 may comprise a pair of end surfaces 408 positioned on opposing ends of the reversible utility blade 402. Each end surface of the pair of end surfaces 408 is configured for alternate engagement with the first blade engagement component 210 of the blade holder 202 to facilitate reversible securement of the reversible utility blade 402 within the blade holder 202. FIG. 5 illustrates the first blade engagement component 210 interfacing with an end surface of the pair of end surfaces 408, allowing the first blade engagement component 210 to provide a longitudinal limit stop for the reversible utility blade 402 within the blade holder 202.

The pair of end surfaces 408 of the reversible utility blade 402 may omit blade retention features (e.g., surface deviations configured to interface with blade engagement components of blade holders). In implementations where the pair of end surfaces 408 of the reversible utility blade 402 includes angled surfaces (e.g., forming a trapezoidal shape for the reversible utility blade 402, as shown in FIG. 4), the first blade engagement component 210 may direct the reversible utility blade 402 against a bottom of the blade holder 202 as the end surface of the pair of end surfaces 408 of the reversible utility blade 402 is forced into engagement with the first blade engagement component 210 (see FIG. 5). Such functionality may improve stability and/or reduce play of the reversible utility blade 402 when held by the blade holder 202.

FIG. 4 also illustrates that the reversible utility blade 402 may comprise a pair of blade retention features 410 that is configured for alternate engagement with the second blade engagement component 220 of the blade holder 202 to facilitate reversible securement of the reversible utility blade 402 within the blade holder 202. The blade retention features of the pair of blade retention features 410 are arranged on a shared surface 412 of the reversible utility blade 402 (e.g., along a top surface opposite to the bottom surface 406 and/or cutting portion of the reversible utility blade 402). FIG. 5 illustrates the second blade engagement component 220 interfacing with a blade retention feature of the pair of blade retention features 410 of the reversible utility blade 402, allowing the second blade engagement component 220 to longitudinally lock the reversible utility blade 402 within the blade holder 202.

In some instances, the biasing element 230 of the blade holder 202 (when present) can bias the reversible utility blade 402 toward a sidewall of the blade holder 202 (e.g., to reduce or eliminate free movement or play of the reversible utility blade 402 within the blade holder 202). Any variations discussed herein for the components of the blade holder 202 relative to holding the utility blade 102 (e.g., a non-reversible blade) may be applicable for holding a reversible blade (e.g., reversible utility blade 402).

A blade holder 202 (or a blade holder comprising one or more similar features/components) may be implemented on various types of knife constructions, such as fixed blade knife constructions (e.g., where the blade holder 202 is at a fixed position relative to the knife handle) and/or deployable blade knife constructions (e.g., where the blade holder 202 is movable relative to the knife handle to facilitate blade deployment). Deployable blade knife constructions may take on various forms, such as out-the-front blade deployment knives, or rotational blade deployment knives. For a rotational blade deployment knife, the blade holder 202 may be affixed to a rotatable element of the knife that rotates relative to the handle of the knife.

Figure 6:
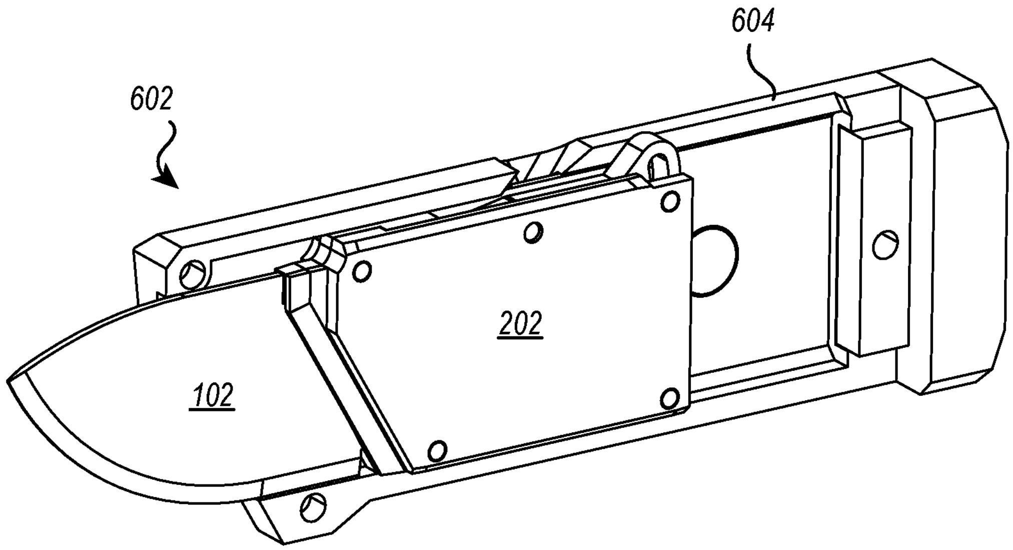
FIG. 6 illustrates a perspective view of a utility knife with a part of a handle thereof removed to show a combination blade holder positioned therein, in accordance with implementations of the present disclosure.

FIG. 6 illustrates a perspective view of a utility knife 602 with a part of a handle 604 thereof removed to show a blade holder 202 positioned therein. The utility knife 602 comprises an out-the-front blade deployment knife, where the blade holder 202 is a translatable blade holder arranged within the handle 604 of the utility knife 602. FIG. 6 shows the utility blade 102 (a non-reversible blade) secured within the blade holder 202 of the utility knife 602 (though other types of non-reversible blades and/or reversible blades may be utilized).

Figure 7A:
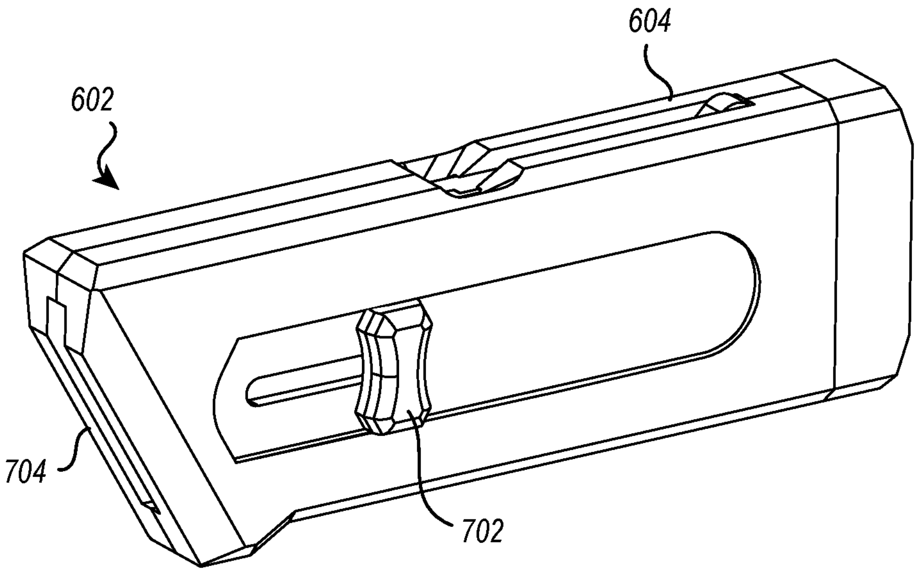
FIGS. 7A through 7C illustrate perspective views of a utility knife in different configurations, in accordance with implementations of the present disclosure.

The blade holder 202 is translatable within (an interior space of) the handle 604 of the utility knife 602 to facilitate selective extension and retraction (e.g., selective deployment) of the blade selectively secured within the blade holder (e.g., a reversible or non-reversible blade). FIG. 7A shows a utility knife 602 in a closed configuration with the utility blade 102 secured to the blade holder 202 and retracted within the handle 604 of the utility knife 602. The utility knife 602 of FIG. 7A includes a slider 702 that is in mechanical communication with the blade holder 202 such that translation of the slider 702 causes translation of the blade holder 202 and utility blade 102. Translation of the slider 702 may thus cause selective extension or deployment of the utility blade 102 through a blade opening 704 at the front of the utility knife 602.

Figure 7B:
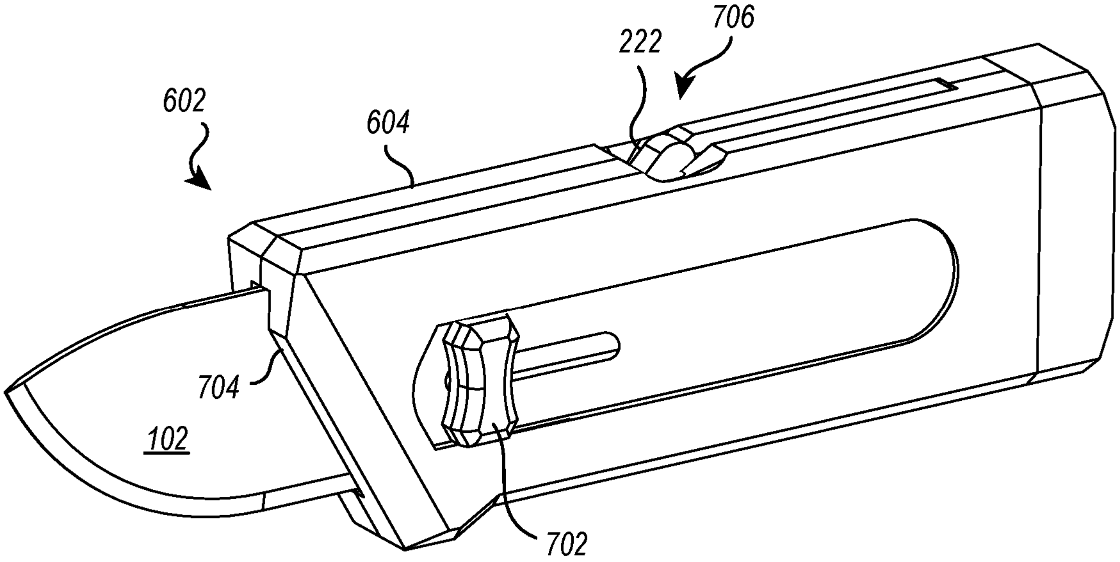
Figure 7C:
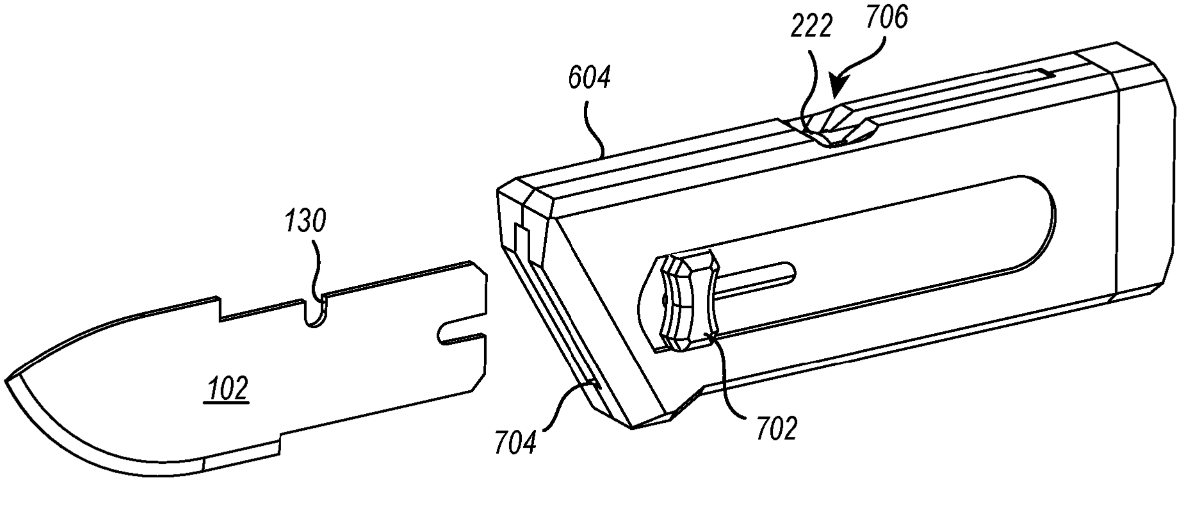

FIG. 7B illustrates the utility knife 602 in a deployed configuration with the utility blade 102 extending out of the blade opening 704 of the utility knife 602. FIG. 7B shows the slider 702 advanced along its movement axis to facilitate the deployment of the utility blade 102 as shown in FIG. 7B. FIG. 7B also shows the actuator 222 of the blade holder 202 extending through and exposed by an actuator opening 706 of the handle 604 utility knife 602. A user may thus actuate the actuator 222 of the blade holder 202 while the blade holder 202 is within the handle 604 of the utility knife 602 (in the deployed configuration of FIG. 7B) to cause the second blade engagement component 220 to disengage from the utility blade 102 within the blade holder 202. FIG. 7C shows the utility blade 102 selectively removed from the utility knife 602 after release of the utility blade 102 from the blade holder 202 by action of the actuator 222 to release the second blade engagement component 220 of the blade holder 202 from the second blade retention feature 130 of the utility blade 102.

In the example of FIGS. 7A through 7C, the actuator opening 706 comprises (i) an enlarged opening about the position where the actuator 222 rests while the utility knife 602 is in the deployed configuration of FIG. 7B and (ii) a slot opening to accommodate the positions of the actuator 222 while the utility knife 602 is in the closed configuration of FIG. 7A and while the actuator 222 translates toward its position for the deployed configuration of FIG. 7B. Such a configuration for the actuator opening 706 may advantageously prevent or reduce the likelihood of inadvertent release of the second blade engagement component 220 of the blade holder 202 from the blade positioned within the blade holder 202 (whether reversible or non-reversible).

In light of the above, it will be appreciated that a utility blade according to one example embodiment may include a first blade retention feature positioned on a proximal edge of a tang of the utility blade. The proximal edge may be angularly offset from a longitudinal axis of the utility blade. The first blade retention feature may be associated with an engagement axis parallel to the longitudinal axis of the utility blade. The utility blade may be configured to translate along the engagement axis to cause the first blade retention feature to engage with a first blade engagement component of a blade holder. The utility blade may also include a second blade retention feature positioned on a second edge of the tang of the utility blade. The second blade retention feature may be positioned along the longitudinal axis of the utility blade and between the first blade retention feature and a distal tip of a cutting portion of the utility blade.

In some embodiments, the first blade retention feature is positioned proximal to the cutting portion of the utility blade along the longitudinal axis of the utility blade.

In some embodiments, all portions of the second edge are arranged distal to the proximal edge along the longitudinal axis of the utility blade.

In some embodiments, the longitudinal axis extends along main length of the utility blade.

In some embodiments, the longitudinal axis is parallel to a non-curved edge of the tang of the utility blade.

In some embodiments, the non-curved edge comprises the second edge upon which the second blade retention feature is positioned.

In another example embodiment, a utility knife includes a utility blade. The utility blade includes a cutting portion that extends a cutting distance from a distal tip of the utility blade in a distal-to-proximal direction along a longitudinal axis of the utility blade. The utility blade also includes a first blade retention feature positioned on a tang of the utility blade at a first distance from the distal tip in the distal-to-proximal direction along the longitudinal axis. The first distance may be greater than the cutting distance. The utility blade may also include a second blade retention feature positioned on the tang of the utility blade at a second distance from the distal tip in the distal-to-proximal direction along the longitudinal axis.

In some embodiments, the second distance is less than the first distance.

In some embodiments, the second distance is greater than the cutting distance.

In some embodiments, first blade retention feature is positioned on a proximal edge of the tang of the utility blade.

In some embodiments, the second blade retention feature is positioned on a second edge of the tang of the blade that is different than the proximal edge.

In some embodiments, the utility blade comprises a non-reversible blade and the utility knife further comprises a blade holder configured to selectively secure the non-reversible blade and, alternately, a reversible blade that is different from the utility blade.

In some embodiments, the blade holder includes a first blade engagement component configured to engage with the first blade retention feature of the non-reversible blade and at least one of a pair of end surfaces of the reversible blade. The pair of end surfaces may be positioned on opposing ends of the reversible blade. The pair of end surfaces may be configured for alternate engagement with the first blade engagement component to facilitate reversible securement of the reversible blade within the blade holder.

In some embodiments, the blade holder includes a second blade engagement component configured to engage with the second blade retention feature of the non-reversible blade and at least one of a pair of blade retention features of the reversible blade. The pair of blade retention features may be positioned on a shared surface of the reversible blade. The pair of blade retention features may be configured for alternate engagement with the second blade engagement component to facilitate reversible securement of the reversible blade within the blade holder.

In yet another example embodiment, a blade holder is provided and is configured to selectively secure a non-reversible blade and, alternately, a reversible blade. The blade holder includes a first blade engagement component configured to engage with a first blade retention feature of the non-reversible blade and at least one of a pair of end surfaces of the reversible blade. The first blade retention feature may be positioned on a proximal edge of a tang of the non-reversible blade. The pair of end surfaces may be positioned on opposing ends of the reversible blade. The pair of end surfaces being configured for alternate engagement with the first blade engagement component to facilitate reversible securement of the reversible blade within the blade holder. The blade holder also includes a second blade engagement component configured to engage with a second blade retention feature of the non-reversible blade at least one of a pair of blade retention features of the reversible blade. The second blade retention feature may be positioned on a second edge of the tang of the non-reversible blade. The second blade retention feature may be positioned along a longitudinal axis of the non-reversible blade and between the first blade retention feature and a distal tip of a cutting portion of the non-reversible blade. The pair of blade retention features may be positioned on a shared surface of the reversible blade. The pair of blade retention features may be configured for alternate engagement with the second blade engagement component to facilitate reversible securement of the reversible blade within the blade holder.

In some embodiments, the pair of end surfaces of the reversible blade omits blade retention features.

In some embodiments, the first blade engagement component comprises one or more fixed rails or pins.

In some embodiments, the second blade engagement component is configured to actuate via an actuator into engagement with the second blade retention feature of the non-reversible blade or the at least one of the pair of blade retention features of the reversible blade.

In some embodiments, the blade holder comprises a translatable blade holder arranged within a handle and configured to facilitate selective extension and selective retraction of the non-reversible blade or reversible blade selectively secured within the blade holder through a blade opening of the handle.

In some embodiments, the actuator extends through a actuator opening of the handle.

In some embodiments, the blade holder also includes a biasing element configured to bias the non-reversible blade or reversible blade selectively secured within the blade holder toward a sidewall of the blade holder.

CONCLUSION

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will also be appreciated that embodiments described herein may also include properties and/or features (e.g., ingredients, components, members, elements, parts, and/or portions) described in one or more separate embodiments and are not necessarily limited strictly to the features expressly described for that particular embodiment. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

What is claimed is:

1. A utility blade, comprising:

a first blade retention feature positioned on a proximal edge of a tang of the utility blade, the proximal edge being angularly offset from a longitudinal axis of the utility blade, the first blade retention feature being associated with an engagement axis parallel to the longitudinal axis of the utility blade, the utility blade being configured to translate along the engagement axis to cause the first blade retention feature to engage with a first blade engagement component of a blade holder;

a second blade retention feature positioned on a second edge of the tang of the utility blade, the second blade retention feature being positioned along the longitudinal axis of the utility blade and between the first blade retention feature and a distal tip of a cutting portion of the utility blade;

first and second angled edges, the first angled edge connecting the proximal edge and a first edge of the tang, and the second angled edge connecting the proximal edge and the second edge of the tang; and the cutting portion extends proximally a cutting distance along an edge of the utility blade from the distal tip, wherein:

the first blade retention feature is positioned on the tang at a first distance along the longitudinal axis from the distal tip, where the first distance is greater than the cutting distance;

the second blade retention feature is positioned on the tang at a second distance along the longitudinal axis from the distal tip, where the second distance is greater than the cutting distance and less than the first distance.

2. The utility blade of claim 1, wherein the first blade retention feature is positioned proximal to the cutting portion of the utility blade along the longitudinal axis of the utility blade.

3. The utility blade of claim 1, wherein all portions of the second edge are arranged distal to the proximal edge along the longitudinal axis of the utility blade.

4. The utility blade of claim 1, wherein the longitudinal axis extends along a main length of the utility blade.

5. The utility blade of claim 4, wherein the longitudinal axis is parallel to a non-curved edge of the tang of the utility blade.

6. The utility blade of claim 5, wherein the non-curved edge comprises the second edge upon which the second blade retention feature is positioned.

7. A utility blade, comprising:

a distal portion comprising opposing and proximally extending first and second edges, at least one of the first and second edges comprises a cutting portion; and a tang extending proximally from the distal portion, the tang comprising opposing and proximally extending first and second edges, a proximal edge, and first and second angled edges, the proximal edge and at least one of the first and second edges of the tang each comprising a blade retention feature, the first angled edge connecting the proximal edge and the first edge of the tang, the second angled edge connecting the proximal edge and the second edge of the tang, the utility blade being configured to translate along an engagement axis that is parallel to a longitudinal axis of the utility blade to cause one of the blade retention features to engage with a first blade engagement component of a blade holder, wherein:

the first edge of the tang is linear;

the second edge of the tang is linear; and the first edge of the tang and the second edge of the tang are parallel to each other and to the engagement axis.

8. The utility blade of claim 7, wherein the first edge of the tang is laterally offset from the first edge of the distal portion or the second edge of the tang is laterally offset from the second edge of the distal portion.

9. The utility blade of claim 7, wherein the blade retention feature of the proximal edge is associated with the engagement axis.

10. The utility blade of claim 7, wherein the blade retention feature of the at least one of the first and second edges of the tang is positioned along the longitudinal axis of the utility blade and between the blade retention feature of the proximal edge and a distal tip of the cutting portion of the utility blade.

11. The utility blade of claim 7, wherein the cutting portion extends proximally a cutting distance from a distal tip of the cutting portion.

12. The utility blade of claim 11, wherein the blade retention feature of the proximal edge is positioned a first distance along the longitudinal axis from the distal tip, where the first distance is greater than the cutting distance.

13. The utility blade of claim 12, wherein the blade retention feature of the at least one of the first and second edges is positioned on the tang at a second distance along the longitudinal axis from the distal tip, the second distance being greater than the cutting distance.

14. The utility blade of claim 13, wherein the second distance is less than the first distance.

15. A utility blade, comprising:

a distal portion comprising opposing and proximally extending first and second edges, at least one of the first and second edges comprises a cutting portion; and a tang extending proximally from the distal portion, the tang comprising:

opposing and proximally extending first and second edges, at least one of the first and second edges of the tang comprising a blade retention feature, the first and second edges of the tang being parallel to each other;

a proximal edge angularly offset from a longitudinal axis of the utility blade, the proximal edge comprising a blade retention feature; and first and second angled edges, the first angled edge connecting the proximal edge and the first edge of the tang, and the second angled edge connecting the proximal edge and the second edge of the tang.

16. The utility blade of claim 15, wherein the cutting portion extends proximally a cutting distance along the utility blade from a distal tip of the cutting portion.

17. The utility blade of claim 16, wherein:

the blade retention feature of the proximal edge is positioned on the tang at a first distance along a longitudinal axis of the utility blade from the distal tip, where the first distance is greater than the cutting distance; and the blade retention feature of the at least one of the first and second edges is positioned on the tang at a second distance along the longitudinal axis from the distal tip, where the second distance is greater than the cutting distance and less than the first distance.

18. The utility blade of claim 15, wherein the first edge of the tang is laterally offset from the first edge of the distal portion and towards a central longitudinal axis of the utility blade.

19. The utility blade of claim 15, wherein the second edge of the tang is laterally offset from the second edge of the distal portion and towards a central longitudinal axis of the utility blade.

20. The utility blade of claim 15, wherein the first edge of the tang is laterally offset from the first edge of the distal portion and the second edge of the tang is laterally offset from the second edge of the distal portion.

* * * * *